May 23, 1950 P. J. McCULLOUGH 2,508,464
THERMAL TIMING DEVICE
Filed Nov. 21, 1945 2 Sheets-Sheet 1

INVENTOR:
PAUL J. McCULLOUGH
BY Rodney Badell
ATTORNEY

May 23, 1950     P. J. McCULLOUGH     2,508,464
THERMAL TIMING DEVICE

Filed Nov. 21, 1945     2 Sheets-Sheet 2

INVENTOR:
PAUL J. McCULLOUGH

BY Rodney Bedell
ATTORNEY

Patented May 23, 1950

2,508,464

UNITED STATES PATENT OFFICE 2,508,464

THERMAL TIMING DEVICE

Paul J. McCullough, St. Louis, Mo., assignor, by mesne assignments, to The Toastswell Company, Incorporated, St. Louis, Mo., a corporation of Missouri Application November 21, 1945, Serial No. 629,947

4 Claims. (Cl. 200—122)

1

The invention relates to devices for controlling electrically operated apparatus, such as electric toasters or other cookers, and more particularly to such apparatus which is set for a heating operation during a single period and then acts automatically to terminate the heating operation.

One object of the invention is to simplify the mechanism for automatically timing the period of operation of electrical apparatus.

Another object is to provide, in electric toasters or other cookers, substantially uniform cooking of the product irrespective of whether the device is hot or cold at the start of the period.

These and other detail objects of the invention as will appear below are attained by the structure shown in the accompanying drawings, which structure is intended to be illustrative and not exclusive of other arrangements embodying the general inventive principles. In these drawings.

Figure 1:
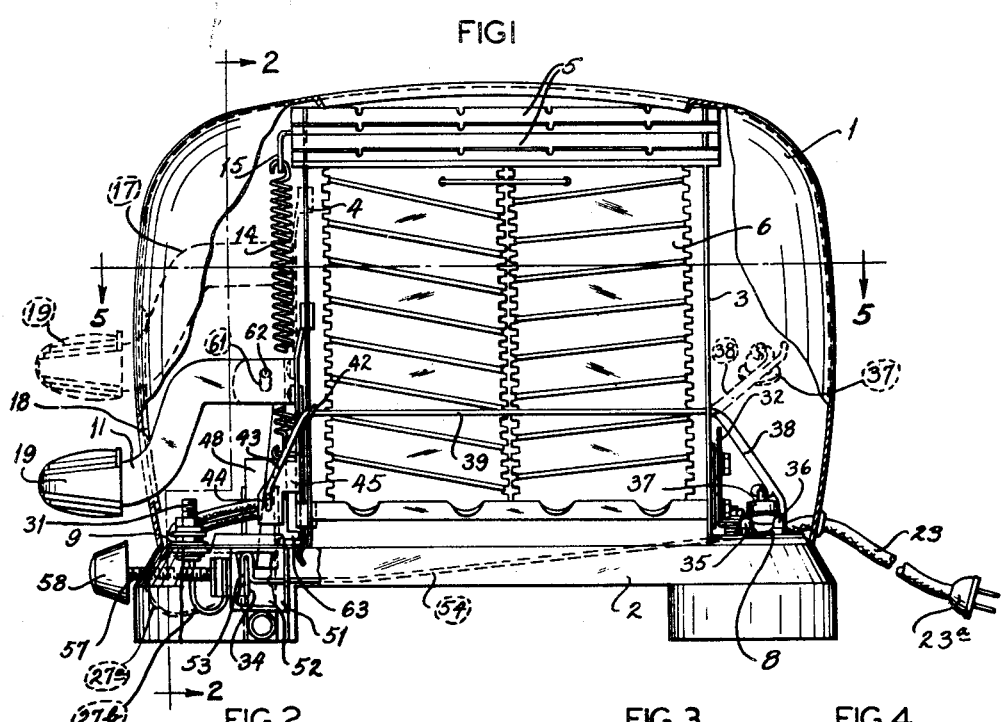
Figure 1 is a side view of a toaster with a portion of the housing cut away and showing the interior construction.

The toaster comprises a housing 1, a base 2, and end plates 3 and 4 secured at the top by channels 5 and at the bottom being bent substantially at right angles to form flanges 8 and 9 attached to base 2. End plates 3 and 4 are spaced from each other longitudinally of the toaster and support spaced parallel heating units 6 positioned perpendicular thereto to form toasting chambers 7.

A carriage 10 having lugs 11 slidably supported in slots 12 in end plate 4 moves up and down

2 thereon. Slice supports 13, rigid with carriage 10, extend into the toasting compartments 7 through slots 12 in plate 4. A tension coil spring 14 has its upper end anchored to a bracket 15 on end plate 4 and has its lower end secured to a link 16 attached to the lower part of carriage 10. Spring 14 yieldingly supports carriage 10 and parts mounted thereon in the elevated position indicated in dotted lines in Figures 1 and 2.

Figures 2, 3, 4:
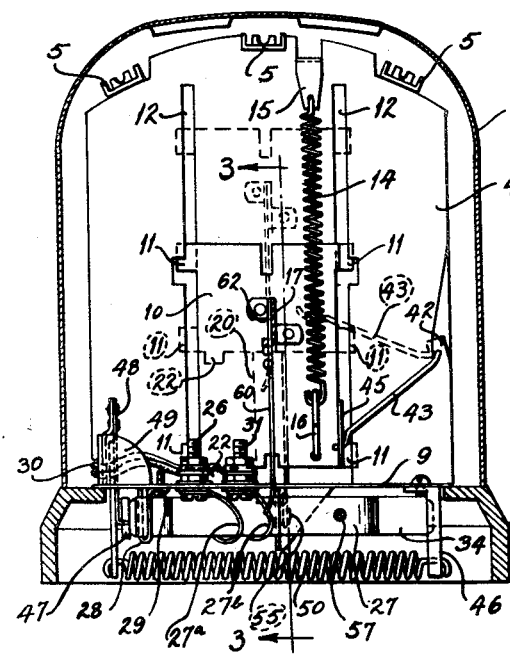
Figure 2 is a transverse vertical section taken approximately on the line 2—2 of Figure 1.
Figure 3 is a detail vertical section on line 3—3 of Figure 2 and shows the snap for holding the carriage in lowered toasting position and the release therefor.
Figure 4 is a similar section showing the position of the thermostat control and release after resetting the toaster for an operation following a previous operation and before the thermostat cools sufficiently to return to its original position.

A bracket 17, rigid with carriage 10, extends through a slot 18 in housing 1 and mounts a handle 19 by which carriage 10 and associated parts may be moved manually from the elevated non-toasting position shown in dotted lines in Figures 1 and 2 to the lowered toasting position shown in solid lines in Figures 1 and 2. In this lowered position a spring snap 20 (Figures 3 and 4) attached to carriage 10 and extending below the bottom edge thereof enters a slot 21 in the bottom of end plate 4 at flange 9 and engages a boundary of the slot to hold carriage 10 in lowered position against upward movement by spring 14. Further downward movement of carriage 10 is prevented by an extension 22 at the bottom thereof engaging flange 9 (Figure 2).

The toaster is connected to a current supply line by a two wire cord 23 having the usual fitting 23a at its outer end for plugging into a suitable outlet. One of the cord wires is secured to a binding post 24 connected by a wire 25 at terminal 26 to a lead 27a attached to one end of a resistance heating unit 27 closely associated with and arranged to heat a thermo-bar 34, described more fully below. The other end of resistance unit 27 is attached to a lead 27b connected at terminal 31 to a wire 30 leading to bus bar 32 to which is connected one end of each of the heating units 6, the other end of each heating unit being connected to a bus bar 33 thus providing a parallel circuit for the heating units between bus bars 32 and 33. Bus bar 33 is connected to a contact 35 adjacent to but spaced from a contact 36 to which the second wire of cord 23 is attached.

Contacts 35 and 36 are connected and disconnected electrically by a disc-like member 37 carried by an arm 38 extending transversely of the toaster from one end of a shaft 39 journalled in a slot 40 in end plate 3 and in a notch 41 in end plate 4. A tab 42 overlies notch 41 and holds the shaft therein. At the other end of shaft 39 is an arm 43 extending transversely of the toaster through a slot 44 in a bracket 45 attached to carriage 10 and movable thereby. Member 37 moves toward and away from contacts 35 and 36 as carriage 10 is lowered and raised and preferably engages contacts 35 and 36 shortly before carriage 10 reaches its lower limit. Arms 38 and 43 and shaft 39 are formed of spring wire and are distorted slightly during additional movement of carriage 10. A switch comprising contacts 35 and 36 and member 37, as described above, is disclosed in a copending application, Serial No. 471,686, filed January 8, 1943, which has resulted in Patent No. 2,503,959, dated April 11, 1950.

Figure 5:
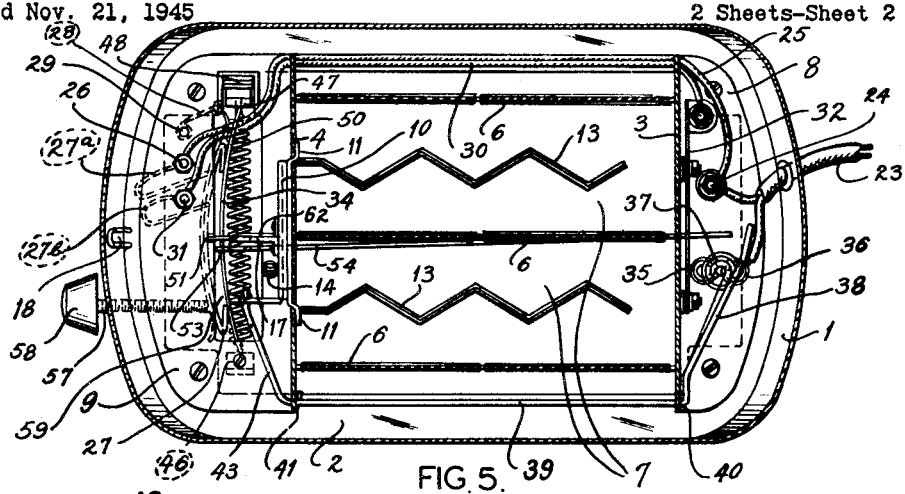
Figure 5 is a horizontal section taken approximately on line 5—5 of Figure 1 and shows the thermostat control when cold.
Figure 6:
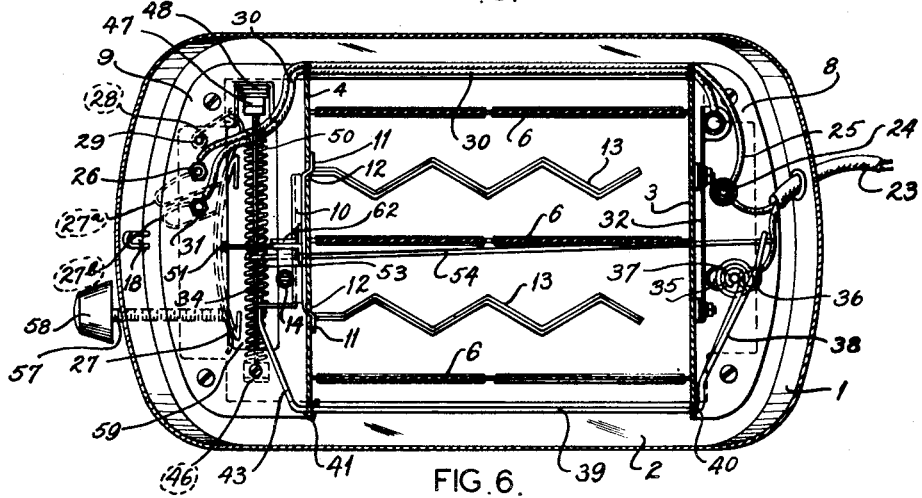
Figure 6 is a section similar to Figure 5 showing the thermostat control when heated to a predetermined temperature.

Thermo-bar 34, positioned adjacent heater 27, when cold is flexed toward the heater, as shown in Figure 5, between a grooved bracket 46 attached rigidly to flange 9 of end plate 4 and a grooved lug 47 supported yieldingly by a flat spring 48 attached at one end to a bracket 49 fastened rigidly to flange 9 of end plate 4. The ends of a coiled tension spring 50 are attached to bracket 46 and to flat spring 48 to maintain thermo-bar 34 flexed even after initial heating until thermo-bar 34 reaches a predetermined temperature sufficient to cause it to flex suddenly away from heater 27 against tension of spring 50 to the position shown in Figure 6. Flexure of thermo-bar 34 toward and away from heater 27 is limited by a member 51 cut out at 52 to receive thermo-bar 34. Member 51 is attached to the bottom of flange 9 of end plate 4 (Figures 1, 3 and 4).

A lever 60 is slotted vertically at 61, near the top, and is slidably supported on bracket 17 by a rivet 62 in slot 61. The lever has at its lower end a finger 63 engaging snap 20. With carriage 10 in toasting position as shown in solid lines in Figures 1 and 2, the lower end of lever 60 lies adjacent thermo-bar 34 when the thermo-bar is flexed toward heater 27 so that, as thermo-bar 34 flexes away from heater 27 at the end of a period, from the position shown in Figure 5 to the position shown in Figure 6, it moves the lower end of lever 60 to the right whereby finger 63 trips snap 20 and releases carriage 10 as shown in Figure 3. Carriage 10 then is raised by spring 14 to the position shown in dotted lines in Figures 1 and 2.

Figure 7:
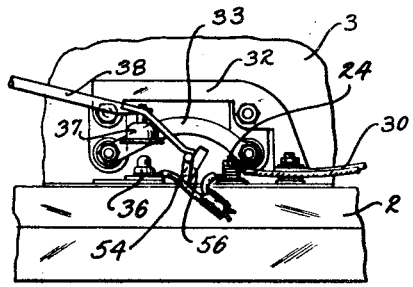
Figures 7 and 8 are detail views of the switch in the positions shown in Figures 6 and 5, respectively.
Figure 8:
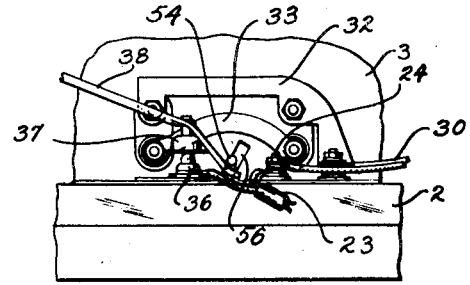
Figure 9:
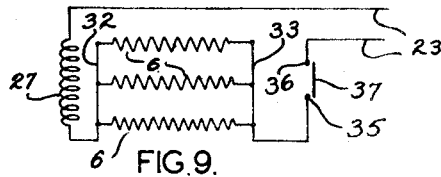
Figure 9 is a schematic wiring diagram.

Attached to thermo-bar 34 near the center thereof by a hook 53 is a rod 54 extending substantially the full length of the toaster. The rod 54 is supported near one end in a vertical slot 55 in member 51 attached to flange 9 (Figure 2) and near the other end in a diagonal slot 56 in end plate 3 (Figures 7 and 8). Rod 54 slides to and fro in slots 55 and 56 as thermo-bar 34 flexes from one position to the other for the purpose described below.

Resistance heating unit 27 is supported pivotally at one end by a hook 28 attached to the lower side of flange 9 by a screw 29. To shorten or lengthen a timing period, the free end of heater 27 can be moved about its pivot on hook 28 toward or away from thermo-bar 34 by a screw 57 threaded into base 2 and rotated by knob 58. With this arrangement, toast of any desired color can be made automatically. The free end of heater 27 is urged yieldingly against screw 57 and away from thermo-bar 34 by leads 27a and 27b which preferably are made of spring material and connect the ends of heater element 27 to terminals 26 and 31, respectively, as described above.

Flange 9 of end plate 4 is cut away at 59 adjacent thermo-bar 34 and heater 27 to permit circulation of air about thermo-bar 34 to cool it as rapidly as possible at the end of a timing period.

The timing device operates as follows:

To begin an initial toasting period when the toaster is cold, handle 19 is pushed downwardly from the upper non-toasting position shown in dotted lines in Figure 1 to the lowered toasting position shown in solid lines in Figure 1 whereby spring snap 20 on carriage 10 engages flange 9 at slot 21 to hold carriage 10 and associated parts in this position against the pull of spring 14. As carriage 10 is lowered, member 37 completes the circuit through contacts 35 and 36 whereupon heating units 6 and heater 27, associated with thermo-bar 34, are energized to begin a toasting period. The period continues until thermo-bar 34 is heated to a predetermined temperature sufficient to cause it to snap against tension of spring 50 from the position shown in Figure 5 to the position shown in Figure 6 to move lever 60 to the right (Figure 3) causing finger 63 to release snap 20, as described above, whereby carriage 10 and associated parts move upwardly to non-toasting position and open contacts 35 and 36 to end the toasting period.

To begin an immediate subsequent period, carriage 10 is pushed downwardly, as described above. However, if thermo-bar 34 has not cooled sufficiently to permit it snap back to the position shown in Figure 5, lever 60 moves downwardly with carriage 10 until its bottom edge rests on the top of thermo-bar 34 (Figure 4). During further downward movement of carriage 10, lever 60 slides on rivet 62 in lever 17. Also, rod 54, moved to the right by thermo-bar 34 during its snap action at the termination of the previous period, engages arm 38 and temporarily prevents member 37 from closing contacts 35 and 36 (Figures 6 and 7) until thermo-bar 34 cools sufficiently to snap back to the position of Figure 5 whereby rod 54 is moved to the left and disengages arm 38 permitting member 37 to close contacts 35 and 36 to begin the toasting period (Figures 5 and 8). Simultaneously, lever 60 drops downwardly between thermo-bar 34 and snap 20 in position to trip snap 20 at the termination of the period when the thermo-bar 34 is heated sufficiently to snap again to the position of Figures 3 and 6. The remainder of the cycle is then repeated.

Thermo-bar 34, in an immediate subsequent period, does not cool to a temperature as low as at the beginning of an initial period, when the toaster is cold, hence an initial period is longer than an immediate subsequent period.

As explained above, light or dark toast may be had at will by turning knob 58 which pivots heater 27 toward or away from thermo-bar 34 to shorten or lengthen the toasting period.

In some instances it may be desirable to inspect the toast before the toasting period is terminated automatically by the timing device. This is done by pushing handle 19 upwardly sufficiently to overcome friction of snap 20, whereupon carriage 10 is moved upwardly to non-toasting position by spring 14.

A timing device of the kind described is simple in construction and operation, yet provides for variations in the length of the initial period, when the toaster is cold, as compared to periods immediately following when the toaster is hot at the start, so that the finished toast is substantially uniform for any setting of knob 58.

The details of the construction may be varied substantially without departing from the spirit of the invention and the exclusive use of such modifications as come within the scope of the claims is contemplated. While there is shown a timing device constructed according to the invention adapted for use on an electric toaster, it should be understood that the timing device can be used on other electrical equipment also.

What is claimed is:

1. In a timing device for an electric circuit, a movable support, a manually operable handle for moving said support to initiate a timing period, a switch member mounted on said support and movable with said support between circuit opening and circuit closing positions, a releasable element for holding said switch member in circuit closing position upon the initiation of a timing period, a heater connected in the circuit, a thermo-bar closely associated with said heater and heated thereby when said switch member is in circuit closing position, a tension spring across the ends of said thermo-bar flexing said thermo-bar in one direction when the bar is cold, said thermo-bar when heated to a predetermined temperature being arranged to flex in the opposite direction against the tension of said spring and suddenly release said element, thereby opening the switch to terminate the timing period, a part connected to said thermo-bar, said thermo-bar, when heated, projecting said part into the path of said support to prevent said switch member from closing the circuit, and said thermo-bar, when cooled, moving said part out of the path of said support so that said switch member may close the circuit.

2. In an electrical timing device, a switch, a heater connected electrically to said switch, a pivot mounting one end of said heater, a thermo-bar for controlling said switch and heated by said heater, a spring extending across the ends of the thermo-bar and flexing the thermo-bar, when cooled, towards said heater, said thermo-bar when heated to a predetermined temperature flexing against the tension of said spring away from said heater to open said switch, thereby terminating a timing period, an adjustable part for moving the other end of said heater toward and away from said thermo-bar to vary the time necessary to heat the thermo-bar to the predetermined temperature and thereby vary the length of the timing period.

3. In a timing device for an electric circuit, a yielding support, a switch member mounted on said support and movable with said support between circuit opening and circuit closing positions, a releasable element for holding said switch member in circuit closing position upon the initiation of a timing period, a heater connected in said circuit, a thermo-bar heated by said heater when said switch member is in circuit closing position, a tension spring across the ends of said thermo-bar flexing said thermo-bar, when cold, towards said heater, said thermo-bar when heated to a predetermined temperature being arranged to flex away from said heater against the tension of said spring and suddenly release said element thereby opening the switch to terminate the timing period, a rod connected substantially to the center of the thermo-bar, said thermo-bar when heated moving said rod to a position for engaging said support to prevent said switch member from closing the circuit when said support is moved toward circuit closing position, and said thermo-bar, when cold, disengaging said rod from said support so that said support may yield and urge said switch member into circuit closing position.

4. A device as described in claim 3 in which a pivot mounts one end of the heater, and an adjustable part moves the other end of the heater toward and away from the thermo-bar to vary the time necessary to heat the thermo-bar to vary the length of the timing period.

PAUL J. McCULLOUGH.

REFERENCES CITED

The following references are of record in the file of this patent:

UNITED STATES PATENTS

| Number | Name | Date |
|---|---|---|
| 2,254,687 | Koci | Sept. 2, 1941 |
| 2,302,117 | Gomersall | Nov. 17, 1942 |
| 2,363,169 | Fischer | Nov. 21, 1944 |
| 2,426,620 | Koci | Sept. 2, 1947 |